Nov. 23, 1965 J. RABINOW 3,219,974

MEANS FOR DETERMINING SEPARATION LOCATIONS BETWEEN SPACED AND TOUCHING CHARACTERS

Filed Nov. 14, 1960 2 Sheets-Sheet 1

Jacob Rabinow

INVENTOR

BY Joseph A. Genovese

ATTORNEY

Jacob Rabinow
INVENTOR

BY Joseph A. Genovese
ATTORNEY

United States Patent Office 3,219,974
Patented Nov. 23, 1965

3,219,974

MEANS FOR DETERMINING SEPARATION LOCATIONS BETWEEN SPACED AND TOUCHING CHARACTERS

Jacob Rabinow, Takoma Park, Md., assignor to Control Data Corporation, Minneapolis, Minn., a corporation of Minnesota Filed Nov. 14, 1960, Ser. No. 68,892
23 Claims. (Cl. 340—146.3)

This invention relates to the art of determining the beginning and end of characters of a printed or typewritten line to enable a character recognition machine to read the individual characters and particularly to know where each character begins and ends.

This application is a continuation-in-part of copending application Serial No. 32,911 filed on May 31, 1960, now Patent No. 3,104,369, disclosing procedures for determining the separation places between characters and also "prelook" techniques.

The prior are relating to character recognition machines which are concerned with reading characters individually and not as words, has tacitly assumed that the characters are spaced sufficiently so that a machine by simple scanning devices, can tell where one character begins and ends. Generally this is done by recognizing the clear white spaces between characters. Unfortunately, characters are not always separated. In ordinary typewriters which use a fixed number of characters per inch, characters are very often made to contact and sometimes overlap slightly. This is done partly to give certain characters as much space as possible and partly because typewriters are often out of adjustment. The problem ordinarily does not arise with the same seriousness in "proportional" typewriters because of the variable spacing for large and small characters. In printing by accounting machines and other equipment having even character spacing, the characters do not overlap and theoretically do not touch. Unfortunately, in order to conserve space the character is usually formed up to the edge of the type, and because of the ink spreading on the paper the characters do sometimes touch slightly. The problem in this case is particularly difficult for a reading machine because the character dimensions are variable and simple spacing techniques are not directly applicable.

Current successful reading machines, of which I am aware, cope with the problem of character separation by requiring that the print being read have all of the characters physically separated. This requires special typewriter adjustment or open print. This solution to the problem imposes a limitation on prior reading machines in that they are either inopeative or unsatisfactorily operative for the vast majority of typed and printed material.

The purpose of my invention is to overcome these difficulties and enable reading machines to function properly with ordinary typed or printed documents. My invention, therefore, will enable any reading machine which recognizes the characters, as apposed to words, to function with material which has been printed or typed in the usual way. Apart from the immediate advantage of retaining the usual printing and typing techniques and existing typewriters, my invention enables character reading machines to function—at least as far as the character separation problem is concerned—with documents that have been typed or printed in the past.

One underlying principle of my invention relies on an averaging technique used in the examination of a line of characters before it enters the reading machine proper or before it reaches the reading station of the machine. In other words, if my invention determines that there are spaces between some of the characters and these spaces fall on the average of twelve to the inch, my invention then assumes that the characters which physically touch are also spaced twelve to the inch. A timing signal is developed on this basis, and the reading cycle of the reading machine is stopped and started (triggered) as if spaces were in fact present between all of the characters.

The assumption that an averagig technique is valid for ordinary typing may be proved by observation. A few characters in the English language almost always touch when typed. For instance, a number of words are spelled with double m's or n's and both of these characters, when following each other, appear as a single long character to the eye and also to a reading machine. However, it is highly unlikely that a line, or a sample portion of the line, would contain all m's or all n's in which case the present invention would be incapable of separating them. It is interesting to note that if this were done, the human eye would probably not separate the characters either. If one assumes that ordinary English print is being typed, or random numbers such as occur in bookkeeping, the chance of the characters being connected one after the other, is extremely remote. And, if this should happen my invention would reject the document as unworkable which, in itself is an advantage, because the present reading machines of which I am aware, would be incapable of reading such material.

Another object of the invention is to provide unique means for determining the separation of characters by an averaging technique involving the detection of the spacing of those characters which are actually separated and extrapolating the results of this detection to provide an output signal modulated with information of the separation places for all of the characters including those which are not physically separated.

One of the features of this invention is the investigatory power of the scan system. In explanation, some characters of print material physically touch. These are not detected by my scanner as separate characters, but all of the other characters of a given sample which do not physically touch provide information on which a timing signal for all of the characters is based. In the simplest operating procedure, assume a horizontally moving line of characters, and a vertical scan element. The vertical scan element (regardless of how it is produced) will detect separation between those characters which are physically separated enough to enable a vertical scan line to be passed between the characters.

But, it often happens that a vertical scan line will not pass vertically between adjacent characters in a horizontally moving line of characters, and a scan line of some other shape will. Lower case o and x, as in the word "oxen," do not ordinarily physically touch, but there is vertical overlap between the left leading edges of the serifs of the x and portions of the right curvature of the letter o. However, a curved scan line will pass between the physically separated, but vertically overlapped features of the letters o and x. Consequently the invention contemplates arcuate scan lines which curve either to the right or to the left. There are other situations where slant scan lines will pass between adjacent characters, and a vertical or curved scan line will not.

Another object of the invention is to provide a character separation technique employing a group of scan line configurations in order to increase the amount of character-separation information which may be obtained from a given sample being investigated for character separation.

Another object of the invention is too provide a character separation technique which yields a timing signal capable of adjusting a reading machine at time intervals in accordance with character separation information obtained in advance of the reading head or reading station, i.e., a "prelook" at the line of print.

Other objects and features of importance will become evident in following the description of the illustrated forms of the invention.

Figure 2:
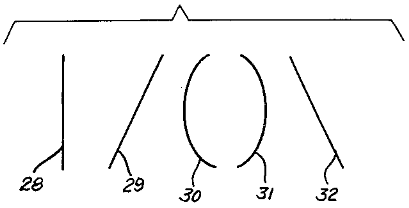
FIGURE 2 is a diagrammatic view showing a group of scan lines used in determining the separation between characters.
Figure 2A:
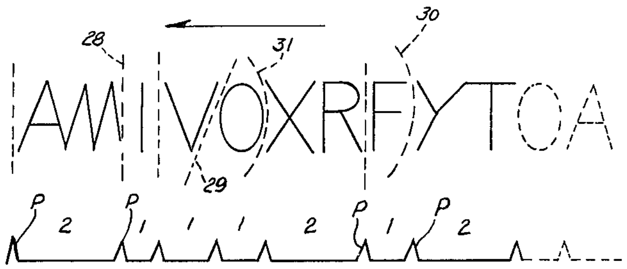

FIGURE 2*a* is a diagrammatic view of a sample line of characters together with some of the scan lines of FIGURE 2 shown in use, and a graph showing the output pulses produced when the scan lines appear on the sample line in such position that the lines fall between characters without physically touching any feature of the characters.

Figures 3, 3A, 4:
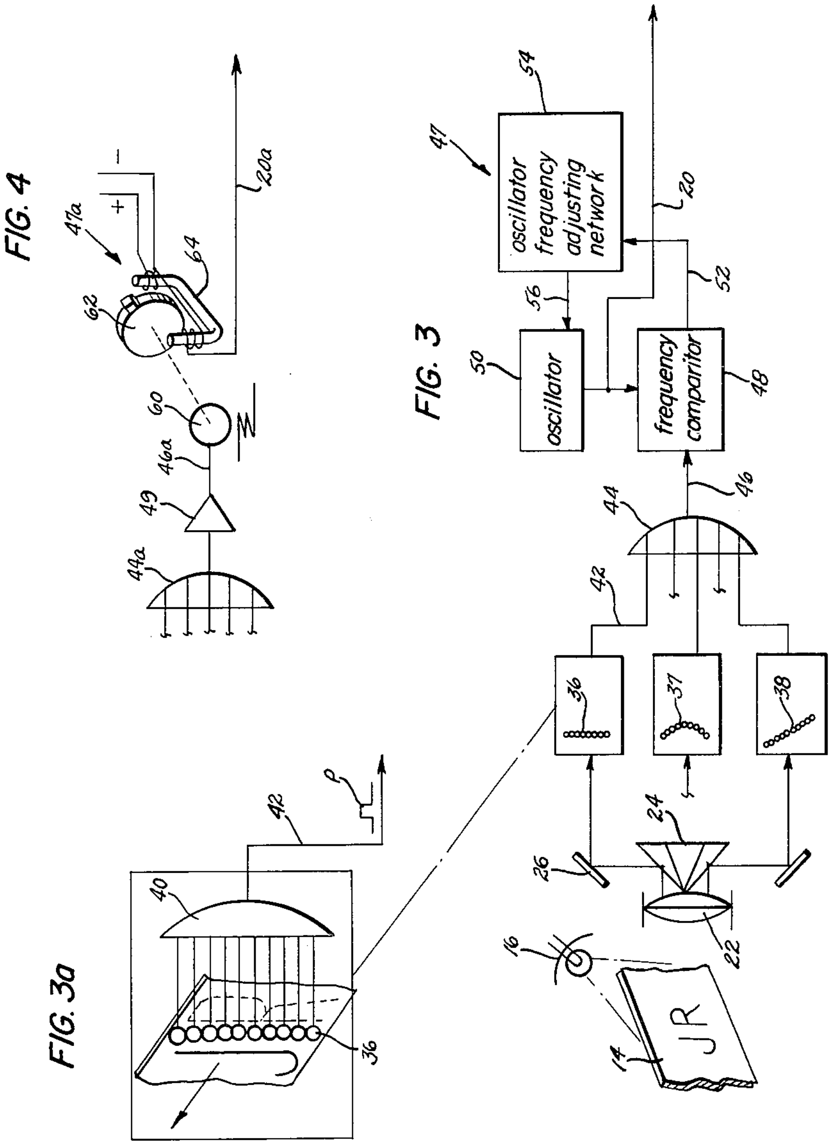

FIGURE 3 is a diagrammatic view showing the apparatus and system for character separation determination.

FIGURE 3*a* is an inset enlargement of one of the scanning sections in my scanner, this figure showing one possible way of producing a single vertical line scan.

FIGURE 4 is a a diagrammatic view showing an electro-mechanical analogy of the system in FIGURE 3.

Figure 5:
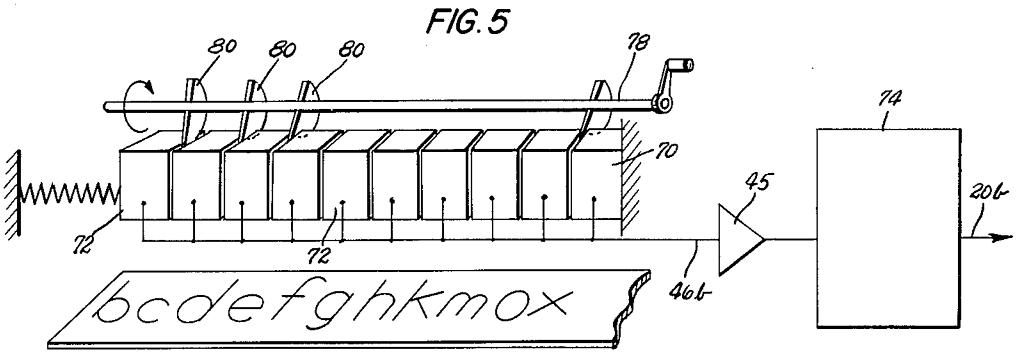

FIGURE 5 is a fragmentary diagrammatic view showing a further modification of my invention.

Figure 1:
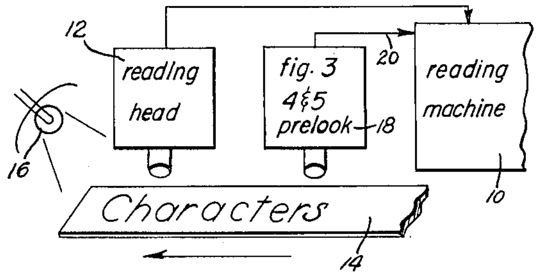
FIGURE 1 is a diagrammatical view showing one general arrangement of my invention with a sample of print material, together with a reading machine.

FIGURE 1 diagrammatically shows a reading machine 10 (for example as in Patent No. 3,104,369) with reading head 12 establishing a reading station for a horizontally moving document 14. The document contains characters such as the sample shown in FIGURE 2*a*. The characters are dark (e.g. black) or a light (e.g. white) surface, illuminated by light source 16. My invention is shown as a "prelook" device 18 located in advance but close to the reading station to minimize paper stretch problems. Device 18 produces a timing signal on line 20 (FIGURE 1) which is fed to the reading machine. The timing signal stops and starts (e.g. triggers) the reading or recognition cycle of machine 10 at intervals corresponding to the width of the characters being read and speed of the document. FIGURE 1, therefore, shows in a general way, one possible arrangement of my invention in conjunction with any conventional reading machine. A horizontally moving document is selected for illustration to facilitate description, but it is to be clearly understood that the document and/or head 12 may be moved in any conventional way.

Attention is now directed to FIGURES 3 and 3*a* disclosing the principle of my invention. As in FIGURE 1, document 14 contains characters on its surface, illuminated by light source 16. The reflected light is passed through a lens 22 and is reflected from a multi-surface beam splitter 24 to mirrors 26. FIGURE 3 shows an optical system essentially identical to the optical system in the J. Rabinow Patent No. 2,933,246, and as described in that patent, a number of complete images are reflected from mirrors 26.

The purpose of the optical system is to enable the illuminated surface of document 14 to be simultaneously scanned by scan lines of different forms of shapes. FIGURE 2 shows scan lines 28, 29, 30, 31, and 32 which are vertical, slanted and curved respectively. The reason for this parameter of scan lines has been mentioned, and the use is shown in FIGURE 2*a*. Although scan lines 28–32 can easily be produced by a rotary optical scan disc, a flying spot, etc., the simplest form of scan line producing means is throught to be a row of photocells for each scan element. A vertical row 36 of photocells (FIGURE 3*a*) will produce scan line 28 whereas a curved row 37 (FIGURE 3) of photocells produces a curved scan line 31, and a diagonal row 38 of photocells produces a diagonal scan line 32. To avoid crowding the drawing, the rows of photocells to produce the other scan lines of FIGURE 2 are not shown in FIGURE 3. Furthermore, different shapes of scan lines can easily be obtained by simply arranging the configuration of rows of photocells accordingly.

The optical system of FIGURE 3 projects five identical images on the faces of the photocells (FIGURES 3 and 3*a*), and the outputs of each photocell of a single row e.g. row 36 (FIGURE 3*a*), are fed to a conventional AND gate 40. When all inputs of gate 40 are satisfied there is an output pulse *p* on output line 42 of gate 40. Gate 40, therefore, requires that all photocells of row 36 see "white" (no part of any of the characters) to produce an output on line 42.

At the same time that row 36 of photocells is investigating an image of document 14 projected on the faces thereof, the scan line producing means containing the other rows 37, 38, etc. of photocells are also investigating images of the same portion of the surface of the document. Therefore, if any one or more of the scan lines see all "white" there will be an output from gate 40 or the corresponding gate (not shown) associated wth each row of photocells. The outputs of all lines 42 are OR gated thru gate 44 so that if any scan line sees a clear space, a signal pulse *p* appears on line 46. Successive outputs for separations between successive characters (pulse *p* in FIGURE 2*a*) are fed as inputs to an electronic flywheel circuit 47.

The transitions (white-to-black and vice versa) detected by the scanner indicate the beginning and end of a character. In an instance where all of the characters of a word are touching, the transitions will indicate the beginning and end of the word. The signal on line 46 can reflect this by a simple circuit which detects a long pulse as would be produced when there is a space between words (normal spacing of printed or typed words). The long pulse would then be differentiated to produce two spaced narrow pulses which are applied to line 46. These automatically indicate the end of one word and the beginning of the next, adding additional information to line 46 for the flywheel circuit.

The electronic flywheel circuit can be constructed in many ways, but probably the simplest to understand is the well-known circuitary used in radio and television receivers. Radio receivers have automatic frequency control circuits and television receivers use flywheel circuits for sync separating. In either case my circuit 47 is similar, using a frequency comparator 48 with an oscillator 50 for one input. The oscillator is a multivibrator of approximately the desired frequency. The signal to be compared with the oscillator frequency is the output of OR gate 44 on line 46.

The output of the frequency comparator is fed on line 52 to an oscillator frequency adjusting network 54, and the output thereof is fed on line 56 to the oscillator 50 in order to adjust it so that the oscillator output matches the average frequency and phase of the signal on line 46. Since this is a flywheel circuit, the timing signal on line 20, which is the adjusted output of the oscillator 50, will not reflect missing pulses on line 46.

FIGURE 2*a* shows a sample of a line of characters being scanned. There will be output pulses *p* (on line 46 of FIGURE 3) such as shown by the graph for the illustrated sample. The flywheel circuitry 47 automatically selects or derives the highest common divisor of the spacing of pulses. The graph shows, in succession, a pulse, two spaces, a pulse, a single space, a pulse, a single space, a pulse, a single space, a pulse, two spaces, a pulse, a single space, a pulse, and two more spaces. Assume that the sample line selected for investigation in FIGURE 2*a* is one inch on enlarged scale. In the space of this one inch the highest common divisor is one tenth. Since we originally postulated that the type or print is of a fixed pitch, the highest common spacing is one tenth, and while some characters are separate while others touch, the flywheel circuitry 47 assumes that the characters are in fact printed or typed ten to the inch. Consequently, the timing signal on line 20 is fed to the control section of the reading machine 10 to cause the reading cycle to be triggered every tenth of the inch of movement of the document 14.

FIGURE 4 shows another flywheel circuit 47*a* without resorting to radio or television circuit techniques. OR gate 44*a* and line 46*a* correspond to gate 44 and line 46 of FIGURE 3. An amplifier 49 is in line 46*a*, and the output of the amplifier is fed to a synchronous motor 60. A feature of a synchronous motor is that it will continue to rotate by flywheel action if it misses an input pulse or several pulses occasionally. Assume that the signal on line 46*a* is as shown by the graph in FIGURE 2*a*. The close pulses i.e. those only one space apart, will cause motor 60 to operate, whereas the motor will coast past those places where the pulse spacing is two or three units instead of one. Flywheel 62 is attached to the synchronous motor 60 and has a tooth which intercepts an electromagnetic field of pulse generator 64 as the flywheel rotates. The output of the pulse generator is on line 20*a* and it is the functional equivalent of the output on line 20.

FIGURE 5 shows a mechanically adjustable form of my invention which is especially useful with "turn-around" documents, i.e. documents which are returned to the sender such as bills and invoices. The prelook scanner 70 is made of a number of scanning means or heads 72, each having rows of photocells such as rows 36, 37, 38, etc., an optical beam splitter, AND gates corresponding to AND gate 40, OR gates responding to gate 44, and an output line 46*b* which corresponds in function to the output line 46 or the output line 46*a*.

There is an amplifier 45 in line 46*b*, and a pulse generator 74 fed by line 46*b*. The pulse generator is adjusted or designed to have a threshold starting voltage or current which would be equal to the sum of the voltages or currents put out by an arbitrary number of the scanning means 72, for instance two or three and more safely, four or five. The reason for this is that each head 72 investigates possible separation between two adjacent characters of the line by a scan line group (FIGURE 2), and it is not safe to rely on only one or possibly two separations. However, when three or four separations are detected by separate heads 72, the threshold of the generator is exceeded, causing it to produce timing pulses.

Scanner 70 may be a fixed unit of, for instance, ten scan means 72 to the inch and adjustable by any suitable mechanism such as a screw or a shaft 78 containing a number of wedges 80 fitted between the means 72 to spread them to positions to say 12 to the inch, 14 to the inch, etc. The heads 72 can be preset to the expected spacing, and this allows sampling, and when the best match (highest voltage or current on line 46*b*) between the heads and the spacing of the characters of the sample line is reached, the scan means 72 setting is kept. It can be seen that the output of pulse generator 74 can be adjusted mechanically or electrically (as by a motor), to be a function of the spacing of scan means 72.

Scanner 70 may be non-adjustable i.e. the spacing of scan means 72 is fixed. In such a case three or four such scanners in tandem are contemplated, with one scanner having a spacing of the common print pitch of say 8 characters to the inch, the next 10 to the inch, the next 12 to the inch, and the next 14 to the inch, etc. Then by comparing the outputs of the scanners 70 with ideal currents or voltages for each scanner 70, the best match is selected in accordance with the philosophy of the J. Rabinow Patent No. 2,933,246, and a pulse generator is operated in accordance therewith to yield a timing signal which is fed to the reading machine.

Output line 46*b* could be fed to an electronic flywheel circuit such as shown in FIGURE 3, a synchronous motor flywheel system as shown in FIGURE 4 or to some other type of means for deriving the average position of the spaces and producing an output timing signal such as on line 20, 20*a* or line 20*b*.

Now consider the concept of "prelook" as discussed in parent Patent No. 3,104,369 with reference to character spacing and the gathering of other information in advance of the photocells of reading head 12. The description is as follows, however a more comprehensive understanding can be obtained by referring to the above patent.

We have a set of photocells which look at the character before the regular set of photocells. This is called a "prelook." These photocells generate information which tells the main equipment at what height to store the information. Effectively then, we could have "prelook" photocells, main photocells, and columns of storage registers, each register being only 14 stages high. The prelook tells the switching circuits which group of main photocells should be connected to the storage stages; thus all of the storage stages are always used, and no further vertical positioning need to be done. This technique of the prelook can also be very effectively used in discovering where one character ends and another character begins.

The detection of the end of a character in situations where they really are touching turns out to be a rather simple matter because of the way in which typewriters are constructed. This is so because the only time we will ever have characters that touch are on machines that have a fixed character spacing. Therefore, our machine can (using a prelook system) make a decision about what the standard spacing of the character is for any particular printed material which is presented to it. Having decided what this character is, it will then be able to set up its timing register in such a way that the end of character signal is given by internal timing. As a whole row of touching characters occurs, the timing machinery will find out what is the highest common divisor of this group of characters and specify that group as being that many characters.

While most of the foregoing disclosure dealt with self-adjusting detectors of the spacing between characters, it should be clearly understood that where the average spacing is known in advance, the spacing can be pre-set into the oscillator circuits so that each clear space re-starts the oscillator and the pre-set spacing is used until the next clear separation or space occurs.

It is understood that numerous changes may be made without departing from my teaching in the art. Therefore, the various forms of my invention are given by way of example only, and all embodiments falling within the scope of the claims may be resorted to.

What is claimed is:

1. Apparatus to determine the spacing between characters which are on the average evenly spaced, said apparatus comprising a scanner, means fed by said scanner for determining the spacing between some of the characters, and means to ascertain the spacing between all of the characters from the output of said determining means.

2. Apparatus to determine the spacing of approximately evenly spaced printed characters with some of the characters touching, prior to feeding a document containing the characters to the reading station of a reading machine, said apparatus comprising means to scan a sample portion of a line of printed characters and in at least one direction transverse to the line for detecting actual separation between characters, means to remember the space lengths between detected separations, means for determining the highest common divisor of said lengths between character separations, and means providing an output signal for the reading machine, said output signal being modulated with character separation information for all characters of the line in accordance with said highest common divisor.

3. Apparatus to determine the separation of characters where some touch and others are separated, said apparatus comprising a scanner to detect the spaces between those characters which are separated and provide an output indicative thereof, and means for producing a timing signal having the correct position of separation of all of the characters by relying on the information of actual separations in said output.

4. Apparatus to determine the spacing between characters of a line where some characters physically touch or overlap but where the characters are on the average evenly spaced, comprising scanning means to detect the actual separation places between those characters which are actually spaced and provide outputs relative thereto, and means responsive to said outputs to determine the spacing of all of the characters in the line.

5. The apparatus of claim 4 wherein said scanning means produce scan lines at an angle to said character line.

6. In character separation apparatus for a reading machine, scan means to examine the space between successive characters of a line, said scan means providing separate scan lines in more than one direction with reference to the direction of the line of characters, and means connected with said scan means for producing an output signifying the positions of the actual and the desired character spacings in accordance with the information gathered by said scan means.

7. The apparatus of claim 4 wherein said scanning means produce said scan lines at more than one angle to the line.

8. The apparatus of claim 7 wherein some of said scan lines are straight and others are curved.

9. An apparatus for determining the spacing between characters of a line of characters comprising a plurality and scanning means operative simultaneously in parallel to detect physical separation between the characters, and coincidence means for producing a character spacing signal in response to the detection of spaces between characters by more than one of said scanning means.

10. For use with a reading machine, apparatus to provide a space signal for the machine read cycle trigger proportional to the character spacing, said apparatus including scanning means to determine the spacing between spaced characters where some of the characters touch and others are spaced, and means responsive to said determined spacing to provide an output signal modulated with information of the actual spacing and the spacing between those characters which would have existed had the touching characters been spaced.

11. The subject matter of claim 10 wherein said determining means include flywheel circuit means.

12. An apparatus to determine the separation places of characters of a line where the characters appear on a section of the line and where some of the adjacent characters touch or have parts which are superposed but do not touch and some of the characters are physically separated, said apparatus comprising means to produce a timing output signal adapted to be fed to a character recognition machine and having repetitive information of the said separation places of all of said characters including those which touch, means for detecting the spaces between the characters which are physically separated and the spaces between characters which have parts that are superposed, and averaging means fed by said detecting means and operatively connected with said timing signal producing means to provide a pitch information input for said timing signal producing means.

13. The apparatus of claim 12 wherein said detecting means include a scanner producing scan lines transversely of the line of characters, and a memory circuit triggered by the outputs of said scanner.

14. The apparatus of claim 13 wherein some of the scan lines are at right angles to the line of characters and some of the scan lines are at another angle to said line of characters.

15. The apparatus of claim 14 wherein said averaging means include a memory circuit which selects the highest common divisor of the detected spaces.

16. Apparatus to determine the separation places of printed characters of a group where some characters are not completely separated, said apparatus comprising means for detecting the spacing of those characters actually separated, and extrapolating means responsive to said detecting means for providing an output signal indicating the separation places for all of the characters of the group.

17. The apparatus of claim 3 wherein said timing signal producing means include flywheel circuit means.

18. In a character recognition system for identifying in turn each character of a word composed of a line of characters, some of which overlap and some of which are separated by a blank area from the adjacent characters of the word, the characters being uniformly spaced along the word, means for producing timing pulses corresponding to the uniform spacing of the characters for initiating the recognition of each character in turn, comprising separation-scanning means for scanning at least one thin line generally perpendicular to the line of the characters and of less thickness than the usual blank area between the adjacent characters of the word; output means associated with said separation-scanning means for producing a pluse signal whenever a blank space is scanned along said line, corresponding to a separation between two adjacent characters of the word; and a flywheel pulse generator controlled by said output means to emit uniformly spaced timing pulses synchronized by the signal pulses produced by said output means so that said timing pulses are spaced in accordance with the uniform spacing of said characters along the word.

19. The invention according to claim 18, wherein there are a plurality of said separation-scanning means, for respectively and simultaneously scanning with lines of different slope and configuration corresponding to different blank spaces between adjacent characters, each of said separation-scanning means producing independently a signal upon scanning a blank space corresponding to its cofiguration; and means supplied with all of said signals to produce an output whenever any of said scanning means produces a signal, and said output being supplied to said output means.

20. Apparatus of claim 16 wherein said spacing detection means include a prelook scanner.

21. For use with a character reading machine having a scanner, a prelook device to investigate the positions of the characters in advance of scanning by said scanner and including means to make available outputs relative to the positions of said characters, and flwheel circuit means to process said outputs to provide a control signal for the reading machine.

22. A character separation system for a line of characters where some of the characters are overlapped, said system comprising a prelook scanner having means to investigate the space between the overlapped characters in a direction at an angle to the vertical division between characters for at least a part of the investigation, and mans to provide a character separation signal from the prelook scanner as a result of the investigation.

23. In a reading machine for identifying individual characters formed in a line wherein the characters are on the average evenly spaced but wherein a pair of the characters either touch or overlap, and wherein the readig machine relies upon a trigger signal corresponding to the clear space between adjacent characters to identify the individual characters; the improvement comprising means for detecting the locations in the line at which there are actual separations between characters and for providing a first output containing signal information corresponding to the locations of said actual separations, an oscillator providing a second output having a predetermined frequency, a frequency comparator having an output signal line, means to conduct said first output to said comparator and means to conduct said second output to said comparator to enable said comparator to provide a frequency comparison output signal on said line, an oscillator frequency adjusting network, said signal line connected to said network so that said network provides an oscillator adjusting signal which corresponds to the signal conducted on said frequency comparator output signal line, and means for conducting said oscillator adjusting signal to said adjustable oscillator so that said second output which is conducted from said oscillator to said comparator is of a frequency corresponding not only to said actual separations between characters but also corresponding to the expected separations between characters of said pair of characters which either touch or overlap.

References Cited by the Examiner

UNITED STATES PATENTS

| | | | |
|---|---|---|---|
| 2,769,379 | 11/1956 | Peery | 340—149 |
| 2,786,400 | 3/1957 | Peery | 340—149 |
| 2,932,006 | 4/1960 | Glauberman | 340—149 |
| 3,111,646 | 11/1963 | Harmon | 340—146.3 |

MALCOLM A. MORRISON, *Primary Examiner.*

STEPHEN W. CAPELLI, *Examiner.*